United States Patent [19]

Bartz et al.

[11] Patent Number: 5,591,844
[45] Date of Patent: *Jan. 7, 1997

[54] ALKYL HYDROXYALKYL CELLULOSE ETHERS CONTAINING SULFOALKYL GROUPS

[75] Inventors: Uwe Bartz, Oestrich-Winkel; Reinhard Dönges, Bad Soden/Taunus; Heiner Klehr, Mainz, all of Germany

[73] Assignee: Hoechst Aktiengesellschaft, Germany

[*] Notice: The term of this patent shall not extend beyond the expiration date of Pat. No. 5,395,930.

[21] Appl. No.: 345,912

[22] Filed: Nov. 28, 1994

Related U.S. Application Data

[63] Continuation-in-part of Ser. No. 72,736, Jun. 7, 1993, Pat. No. 5,395,930.

[30] Foreign Application Priority Data

Jun. 6, 1992 [DE] Germany ............ 42 18 738.9

[51] Int. Cl.$^6$ ............ C08B 11/193; C04B 24/02; C04B 40/00; C08L 1/28
[52] U.S. Cl. ............ 536/90; 536/91; 536/92
[58] Field of Search ............ 536/90, 91, 92

[56] References Cited

U.S. PATENT DOCUMENTS

| | | | |
|---|---|---|---|
| 2,583,657 | 1/1952 | Lea et al. | 536/53 |
| 2,795,508 | 6/1957 | Kaveler et al. | 536/53 |
| 3,357,971 | 12/1967 | Klug | 536/53 |
| 4,990,609 | 2/1991 | Herzog et al. | 536/53 |
| 5,177,199 | 1/1993 | Kiesewetter et al. | 536/53 |
| 5,182,380 | 1/1993 | Breckwoldt et al. | 536/53 |
| 5,395,930 | 3/1995 | Bartz et al. | 536/92 |

FOREIGN PATENT DOCUMENTS

| | | |
|---|---|---|
| 0319867 | 3/1988 | European Pat. Off. . |
| 0470444 | 7/1991 | European Pat. Off. . |
| 0487988 | 11/1991 | European Pat. Off. . |
| 0554751 | 1/1993 | European Pat. Off. . |
| 0554749 | 1/1993 | European Pat. Off. . |
| 3910730 | 10/1990 | Germany . |
| 470994 | 8/1937 | United Kingdom . |
| 2138014 | 10/1984 | United Kingdom . |

*Primary Examiner*—Nathan M. Nutter
*Attorney, Agent, or Firm*—Connolly & Hutz

[57] ABSTRACT

The present invention relates to alkyl hydroxyalkyl cellulose ethers which contain a sulfoalkyl group as a further substituent, to a process for the preparation of these cellulose ethers and to building material mixtures which are based on gypsum, hydrated lime or cement and contain alkyl hydroxyalkyl cellulose ethers containing sulfoalkyl groups.

16 Claims, 1 Drawing Sheet

ALKYL HYDROXYALKYL CELLULOSE ETHERS CONTAINING SULFOALKYL GROUPS

This application is a continuation-in-part of application Ser. No. 08/072,736, filed Jun. 6, 1993, and now U.S. Pat. No. 5,395,930.

Commercially available cellulose ethers are as a rule water-soluble compounds which are prepared by etherifying cellulose in an alkaline solution. Examples of usual esterifying reagents are alkyl halides, alkylene oxides and halocarboxylic acids.

Numerous cellulose ethers serve as auxiliaries in industrial fields of application and are used above all in building material mixtures, such as plasters, adhesives and filling compounds, as thickeners, water retention agents, film formers and viscosity modifiers. Water retention capacity is to be understood as the ability to retard the release of the water contained in the mixed building material mixture. The addition of cellulose ethers to the building material mixtures reduces the rate of water release to the subsoil, and the water is available for uniform setting and hardening of the building material mixture. In plasters, adhesives and filling compounds, shrinkage and cracking are thereby prevented, and the adhesive power and processibility are improved.

DE-A-3,910,730 has disclosed the use of cellulose ethers, which additionally contain carboxymethyl groups apart from methyl groups and hydroxyalkyl groups, in gypsum mixtures. Although these auxiliaries have an improved water retention capacity at elevated temperature, their use is limited by the sensitivity of the carboxyl groups to alkaline earth metal ions.

In U.S. Pat. No. 2,795,508, the use of sulfoalkyl cellulose ethers and salts thereof as cement setting retarders in crude oil exploration is described.

U.S. Pat. No. 2,583,657 mentions the use of alkyl sulfoethyl cellulose ethers and salts thereof as water retention agent in well-cementing mixtures in crude oil exploration.

U.S. Pat. No. 3,357,971 has disclosed water-soluble hydroxypropyl sulfoalkyl cellulose ethers and their use as thickeners, as stabilizer or surface-treating agent at elevated temperature, for example in paints, adhesives and foodstuffs.

GB-B-470,994 discloses a process for the preparation of sulfoethyl cellulose ethers and mixed ethers thereof, such as methyl sulfoethyl cellulose ether and hydroxyethyl sulfoethyl cellulose ether.

In spite of the cellulose ethers already known from the state of the art, there is still a demand for cellulose ethers which are distinguished by improved properties with respect to the highest possible flocculation temperature, good solubility in warm water, low sensitivity to polyvalent ions and low sensitivity of the flocculation temperature to fluctuations in pH.

Surprisingly, it has been found that alkyl hydroxyalkyl cellulose ethers which additionally also contain a sulfoalkyl group as an ether substituent are distinguished by such improved properties.

The invention relates to alkyl hydroxyalkyl cellulose ethers which contain a sulfoalkyl group as a further ether substituent.

The invention also relates to a process for preparing the cellulose ethers according to the invention by etherification of cellulose in an alkaline medium with at least one compound transferring an alkyl group, with at least one compound transferring a hydroxyalkyl group and with at least one compound transferring a sulfoalkyl group, comprising the process steps of:

a) alkalizing the cellulose b) adding the compound transferring hydroxyl groups during or subsequently to a), c) if necessary, adding further alkalizing agent subsequently to b) and d) adding the compound transferring alkyl groups during or subsequently to b) or, if appropriate, c), wherein e) the addition of the compound transferring sulfoalkyl groups is already made during process step a), but at the latest before process step d).

BRIEF DESCRIPTION OF THE DRAWING

In the accompanied drawing.

DETAILED DESCRIPTION

Figure 1:
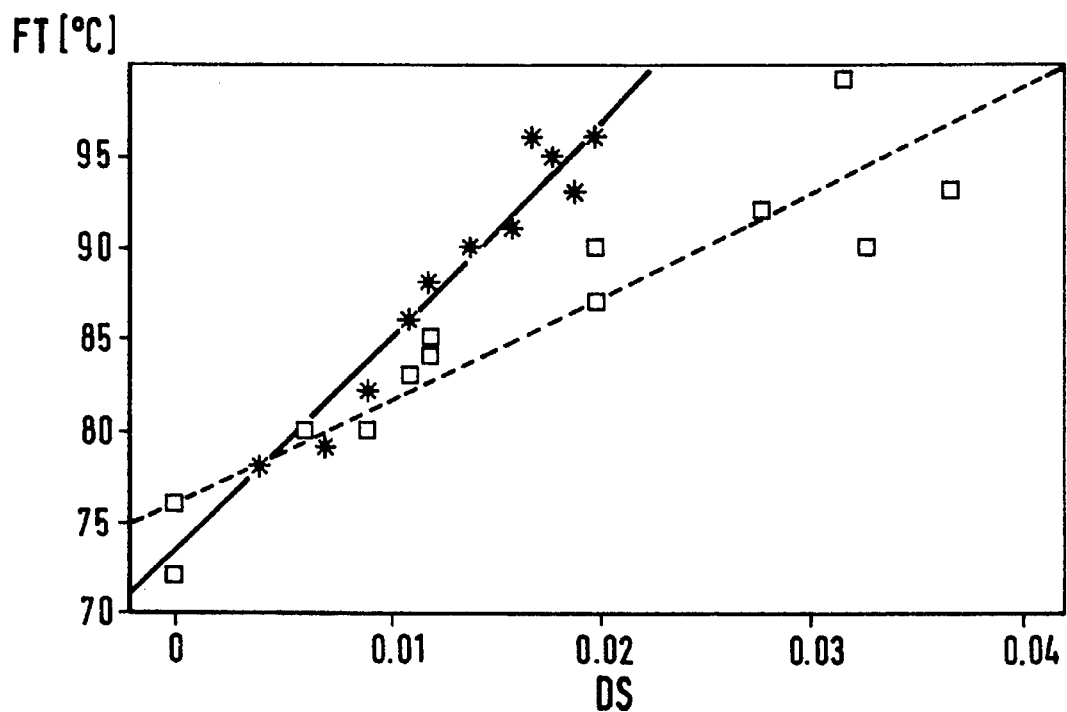
FIG. 1 is a graphical plot illustrating the higher flocculation temperatures ("FT") of a typical cellulose ether of this invention as compared to a typical methylhydroxyethyl carboxymethyl cellulose ether.

The cellulose ethers according to the invention contain three different ether substituents, namely alkyl groups, hydroxyalkyl groups and sulfoalkyl groups. The alkyl groups have preferably one to three carbon atoms. The hydroxyalkyl groups are preferably hydroxyethyl and hydroxypropyl groups. The sulfoalkyl groups are preferably sulfoethyl and sulfopropyl groups.

The purpose of the next paragraph is to explain the term "average degree of substitution (DS)" and "molar degree of substitution (MS)". In the cellulose molecule, there are three hydroxyl groups per anhydroglucose unit. The DS is to be understood as the average number of the hydroxyl groups substituted in the cellulose per anhydroglucose unit. The MS is to be understood as the average number of moles of the reactant combined with the cellulose per anhydroglucose unit. For the cellulose derivatives carrying alkyl groups, the DS and MS are equal. At low degrees of substitution, this also applies to sulfoalkyl groups. For cellulose derivatives carrying hydroxyalkyl groups, the MS is in general greater than the DS.

The cellulose ethers according to the invention have a $DS_{alkyl}$ from 1.0 to 2.0, a $DS_{sulfoalkyl}$ in the range from 0.004 to 0.6 and an $MS_{hydroxyalkyl}$ in the range from 0.01 to 1.

The molecular weights are of an order of magnitude of between 10,000 and 500,000. The viscosities are between 3 and 300,000 mPa.s (according to Höppler, 2% by weight aqueous solution, 20° C.)

The cellulose ethers according to the invention can be prepared by various processes.

Starting from an alkyl hydroxyalkyl cellulose ether, such as methyl hydroxyethyl cellulose ether, a reaction with a compound transferring sulfoalkyl groups is carried out. For this purpose, an alkalizing agent is added to the alkyl hydroxyalkyl cellulose ether which may be moist. The preferred alkalizing agent used is aqueous alkali metal hydroxide solution, such as sodium hydroxide solution. The concentration of the alkalizing agent can extend over a wide range. The use of concentrated alkalizing agents is, however, preferred so that the water content is not unduly increased. For alkali metal hydroxide solution, the concentration is usually about 50% by weight. During or after the addition of the alkalizing agent, the compound transferring sulfoalkyl groups is added. Examples of suitable compounds are sodium vinylsulfonate, chloroethanesulfonic acid and propanesultone. The nature and quantity of the compound depend on the desired type of substitution and the desired degree of substitution. The sulfoalkylation takes place at temperatures of up to 90° C., preferably 70° to 90° C. The sulfoalkylation is complete after on average 20 hours.

It is also conceivable, however, to prepare the cellulose ethers according to the invention starting from a mixed alkenyl cellulose ether, such as allyl hydroxyethyl cellulose ether, by reaction with sodium hydrogen sulfite.

In the preferred process for preparing the cellulose ethers according to the invention, the etherification of the cellulose is carried out in alkaline solution with at least one compound transferring an alkyl group, at least one compound transferring hydroxyalkyl groups and at least one compound transferring a sulfoalkyl group. Usual compounds transferring alkyl groups are alkyl halides such as methyl chloride and ethyl chloride. Usual compounds transferring hydroxyalkyl groups are alkylene oxides such as ethylene oxide, propylene oxide and 1,2-butylene oxide. The preparation can be carried out in the presence of an excess of etherifying agent and/or in the presence of a suspending agent. Suitable suspending agents are the suspending agents usually employed in cellulose ether chemistry, preferably organic solvents such as ethers or hydrocarbons. Particularly suitable ethers are dimethyl ether, diethyl ether, dimethylglycol or cyclic ethers such as dioxane and tetrahydrofuran. Suitable hydrocarbons are toluene and hexane.

In its course, the preferred process largely corresponds to the process for preparing alkyl hydroxyalkyl cellulose ethers.

The individual process steps are explained in more detail below:

a) Alkalizing the cellulose:

Usually, ground cellulose pulp of a particle size of 0.3 mm is used.

The alkalizing agent used is, for example an aqueous alkali metal hydroxide solution which is usually employed in a concentration of up to 50% by weight. The quantity of alkalizing agent used in the alkalization of the cellulose is in the ratio of 1.0–6.0:1.0, relative to the molar quantity of cellulose. The addition of the alkalizing agent can be carried out continuously or in portions. To ensure that the alkalization and subsequent etherification are as uniform as possible, it is of advantage to suspend the cellulose in a suspending agent. The quantity by weight of suspending agent is in the ratio of 1.0–20.0, relative to the weighed amount of cellulose.

b) Hydroxyalkylation:

The addition of the compound transferring hydroxyl groups is usually carried out during or subsequently to the alkalization of the cellulose. The nature and quantity of this etherifying agent depends on the desired type of substitution and on the desired degree of substitution. The hydroxyalkylation preferably takes place in a temperature range between 60° and 90° C.

c) If necessary, additional alkalization:

It has been found that it is an advantage to add a certain quantity of further alkalizing agent after the hydroxyalkylation b). The quantity of alkalizing agent is that required to reach the desired degree of alkylation. Depending on the quantity of alkalizing agent used at the start of the reaction, this is usually 0–5 mol per mole of cellulose. This additional alkalization takes place at a temperature in the range between 30° and 100° C.

d) Alkylation:

After the addition of the further alkalizing agent, the desired agent transferring alkyl groups is added, the nature and quantity of the agent transferring alkyl groups depending on the desired type of substitution and on the desired degree of substitution.

e) Sulfoalkylation:

During or subsequently to the alkalization a) and/or during or subsequently to the hydroxyalkylation b), the compound transferring sulfoalkyl groups is added to the alkali cellulose or to the hydroxyalkyl cellulose. The quantity added depends on the desired degree of substitution and is usually in the range between 0.01 and 1.5 mol per mole of alkali cellulose. The sulfoalkylation is usually carried out at a temperature between 70° and 90° C. and is complete after approximately one hour.

f) Purification:

The reaction with the various etherifying agents is usually followed by the working-up of the reaction batch, i.e. purification of the cellulose ether prepared. The cellulose ether prepared is washed, the washing step depending on the solution behavior of the cellulose ether.

Cellulose ethers which are insoluble in hot water are preferably washed with water at a temperature of 95°–100° C.

Cellulose ethers which have a low solubility in water in the region of 100° C. can be freed of the organic by-products by means of salt-containing water. The temperature of the washing water is 95°–100° C. The important point here is that the washing water contains such a quantity of salt, for example common salt, that only a very small part of the cellulose ether to be purified or none at all goes into solution.

Cellulose ethers having a high solubility in water at about 100° C. are usually washed with mixtures of water and organic solvents. Suitable organic solvents are water-miscible solvents such as alcohols, water-miscible ethers and ketones, such as methanol, ethanol, isopropanol, dimethylglycol, dioxane, tetrahydrofuran and acetone.

It is also possible to add the agent transferring hydroxyl groups and the agent transferring alkyl groups simultaneously (steps b and d). An additional alkalization (step c) is then not necessary. The quantity of alkalizing agent required for etherification is in this case added in step a. In this mode of preparation, the addition of the agent transferring sulfoalkyl groups (step e) is made before or during the simultaneous addition of the agent transferring hydroxyl groups and of the agent transferring alkyl groups (steps b and d).

A likewise suitable mode of preparing the cellulose ethers according to the invention comprises initially the alkalization of the cellulose (step a), followed by the addition of the compound transferring hydroxyl groups (step b), then the addition of the compound transferring sulfoalkyl groups (step e), if necessary followed by addition of further alkalizing agent (step c), and subsequently the addition of the compound transferring alkyl groups (step d).

As compared with cellulose ethers without sulfoalkyl groups, the cellulose ethers according to the invention are distinguished by a number of advantages, which can be summarized as follows:

generally a high flocculation temperature, specifically, a high flocculation temperature can be reached even at a low degree of sulfoalkylation, low sensitivity of the flocculation temperature to fluctuations in pH.

The flocculation temperature is understood as the temperature at which a 1% by weight solution of the cellulose ether still has 50% of the transparency measured at room temperature.

FIG. 1 shows the dependence of the flocculation temperature (FT, °C.) on the degree of anionic substitution (DS) of the methyl hydroxyethyl sulfoethyl cellulose ethers (MHESEC) according to the invention as compared with methyl hydroxyethyl carboxymethyl cellulose ethers (MHECMC). The cellulose ethers used have the following characteristic data:

MHESEC (*): $DS_{alkyl}$=1.9; $MS_{hydroxyalkyl}$=0.12

MHECMC (□): $DS_{alkyl}$=1.6; $MS_{hydroxyalkyl}$=0.21

The degree of anionic substitution (DS) is to be understood as the degree of sulfoethylation or the degree of carboxymethylation of the cellulose ether. The measurement is carried out in a 1.0% by weight aqueous solution.

The sulfoethylated cellulose ethers according to the invention have a higher flocculation temperature at the same degree of substitution.

Figure 2:
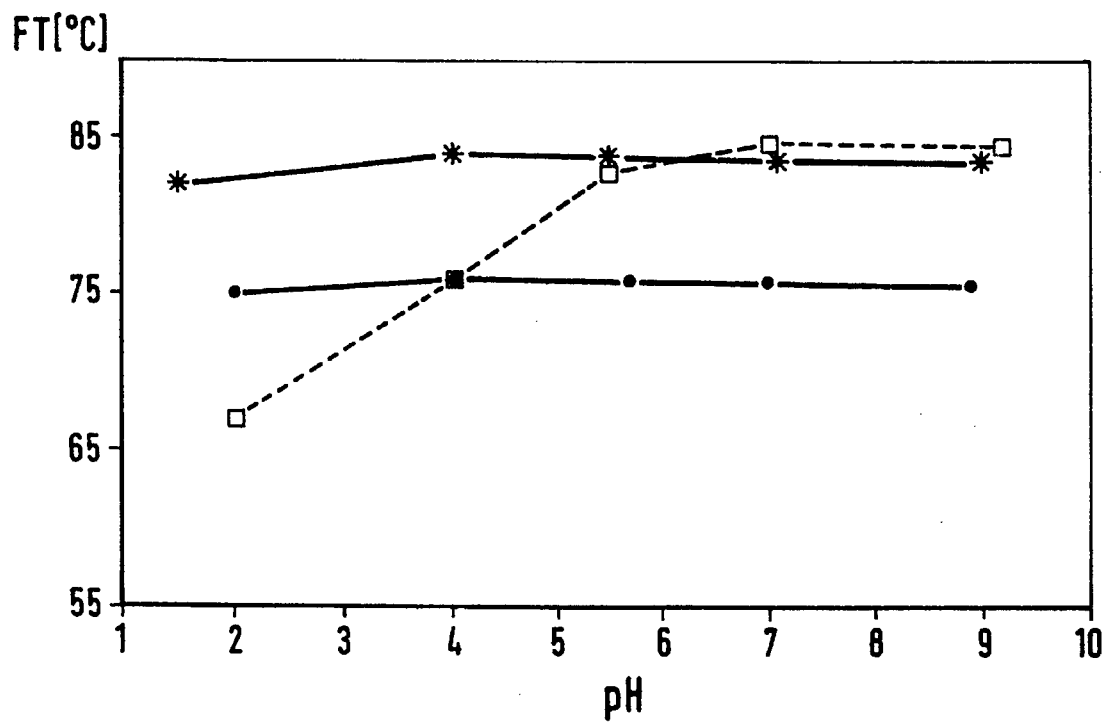
FIG. 2 is a graphical plot illustrating the higher and/or relatively more constant flocculation temperatures ("FT") of a typical cellulose ether of this invention as that compared to a typical hydroxyethyl carboxymethyl cellulose ether and a typical methylhydroxyethyl cellulose.

FIG. 2 shows the dependence of the flocculation temperature (FT, °C.) on the pH of the solution of the cellulose ethers (MHESEC) according to the invention as compared with other anionically substituted cellulose ethers (MHECMC) and nonionic cellulose ethers (MHEC).

The cellulose ethers used have the following characteristic data:

MHESEC (*): $DS_{alkyl}$=1.9; $MS_{hydroxyalkyl}$=0.12

MHECMC (□): $DS_{alkyl}$=1.6; $MS_{hydroxyalkyl}$=0.21

MHEC (·): $DS_{alkyl}$=1.7; $MS_{hydroxyalkyl}$=0.20

The measurement is carried out in a 1% by weight aqueous solution of common salt (0.3% by weight of common salt, relative to the quantity of water, and at a heating rate of 3° C./minute).

At pH values of >7, the two anionic cellulose ethers have a flocculation temperature higher than that of the nonionic cellulose ether. At pH values of <7, the cellulose ethers according to the invention have a significantly higher flocculation temperature as compared with the carboxymethylated cellulose ethers.

The cellulose ethers according to the invention are suitable as additives for building material mixtures such as plasters, mortars, adhesives and filling compounds based on gypsum, hydrated lime and cement. It has been found that the cellulose ethers according to the invention are distinguished by an improved water retention capacity (WRV) as compared with the cellulose ethers hitherto used, especially at temperatures in the region of 30° C. and higher. The cellulose ethers used according to the invention have preferably a $DS_{alkyl}$ from 1.0 to 2.0, an $MS_{hydroxyalkyl}$ from 0.01 to 1 and a $DS_{sulfoalkyl}$ from 0.004 up to 0.6. Furthermore, they have preferably a viscosity in the range from 3 to 300,000 mPa.s (according to Höppler, 2% by weight aqueous solution, 20° C.) and a particle size of <1 mm, preferably in the region of <0.2 mm. The cellulose ethers are used in a quantity from 0.001 to 5% by weight, relative to the dry weight of the building material mixture.

Sulfoalkyl cellulose ethers, alkyl sulfoalkyl cellulose ethers, especially methyl sulfoethyl cellulose ether (MSEC) and methyl sulfopropyl cellulose ether (MSPC), are also cellulose ethers which are suitable as water retention agents. These cellulose ethers are known, for example, from U.S. Pat. Nos. 3,357,971, 2,795,508, 2,583,657 and GB-B-470, 994.

The alkyl sulfoalkyl cellulose ethers used have a $DS_{alkyl}$ from 1 to 2 and a $DS_{sulfoalkyl}$ from 0.005 to 0.6. The viscosity of these cellulose ethers is in the range between 100 and 300,000 mPa.s (according to Höppler, 2% by weight aqueous solution, 20° C.), and the particle size is <1 mm, preferably in the region of <0.2 mm. The alkyl sulfoalkyl cellulose ethers are used in a quantity from 0.001% by weight to 5% by weight, relative to the dry weight of the building material mixture. The cellulose ethers according to the invention can also be used in combination with nonionic cellulose ethers such as methylcellulose (MC), methylhydroxyethylcellulose (MHEC), methylhydroxypropylcellulose (MHPC) and ethylhydroxyethylcellulose (EHEC).

The building material mixtures based on gypsum, hydrated lime and cement usually contain auxiliaries and/or modifiers. Suitable auxiliaries are hydrocolloids, air-entraining agents, plastic dispersion powders, water-proofing agents, swelling agents, fillers, light-weight additives, plasticizers and also retarders or accelerators. Typical fillers are quartz sand, limestone sand or powders of these (particle size: 5 μm-5 mm).

The building material mixtures based on gypsum, hydrated lime and cement usually have the following composition (dry matter):

99.99–1% by weight gypsum, hydrated lime, cement or hydrated lime, cement 0.001–5% by weight abovementioned cellulose ethers according to the invention and known cellulose ethers 0–90% by weight quartz sand or limestone sand 0–10% by weight plastic dispersion powders 0–10% by weight light-weight additives 0–1% by weight waterproofing materials 0–0.5% by weight starch ethers 0–0.1% by weight air-entraining agent Water is added to the dry mass thus obtained until the desired consistency has been reached.

The invention is explained in more detail below by reference to preferred preparation examples and application examples.

The percentage data are percent by weight.

The symbols mean:

M=methyl

HE=hydroxyethyl

SE=sulfoethyl

NaVS=sodium vinylsulfonate

ΔWRV=decrease in the water retention capacity in percentage points at a temperature increase from 20° to 40° C.

PREPARATION EXAMPLES

Preparation of Methylhydroxyethylsulfoethylcellulose (MHESEC)

162 g of ground cellulose pulp are alkalized in a Lödige mixer with a solution of sodium hydroxide in 200 ml of water. Aqueous sodium vinylsulfonate solution (25–30%) is added and mixing is continued for about 15 minutes. After the mixture has been transferred into a pressure-resistant stirred vessel, the latter is evacuated and blanketed with nitrogen, and a mixture of 1260 g of methyl chloride and 22 g of ethylene oxide is injected. The etherification is carried out for about 60 minutes at 80°–90° C. The product obtained is washed out with hot water, dried and finely ground for the application test. Products which are soluble in hot water are extracted with 80% isopropanol until largely salt-free.

the addition of a second portion of concentrated sodium hydroxide solution (2,900 g), the mixture is reacted with methyl chloride (2,722 g) for 60 minutes at 100° C. The suspending agent is distilled off, and the product is washed once with water at about 95° C. and then rinsed with 80% aqueous isopropanol.

TABLE 1

Methylhydroxyethylsulfoethylcellulose (MHESEC)

| Example Comparative Example | Quantity employed NaOH (g) | NaVS (g) | (%) | Degree of substitution M | HE | SE | Salt content (%) | Viscosity (mPa · s) (2%) | Flocculation temperature (°C.) |
|---|---|---|---|---|---|---|---|---|---|
| 1 | 154 | 5.2 | 25 | 1.79 | 0.12 | 0.004 | 0.02 | 24,000 | 78 |
| 2 | 100 | 13.0 | 25 | 1.48 | 0.13 | 0.014 | 0.16 | 94,000 | 90 |
| 3 | 100 | 10.8 | 30 | 1.40 | 0.15 | 0.014 | 0.52 | >100,000 | 90 |
| 4 | 112 | 13.0 | 25 | 1.58 | 0.13 | 0.016 | 0.07 | 61,000 | 91 |
| 5 | 134 | 10.8 | 30 | 1.75 | 0.12 | 0.011 | 0.43 | >100,000 | 86 |
| 6 | 144 | 13.0 | 25 | 1.78 | 0.12 | 0.017 | 0.12 | 29,000 | 96 |
| 7 | 154 | 13.0 | 25 | 1.78 | 0.12 | 0.018 | 0.14 | 27,000 | 89 |
| 8 | 154 | 13.0 | 25 | 1.83 | 0.12 | 0.012 | 0.00 | 24,000 | 88 |
| 9 | 100 | 26.0 | 25 | 1.45 | 0,14 | 0.016 | 0.16 | 72,000 | >100 |
| 10 | 100 | 21.7 | 30 | 1.44 | 0.15 | 0.018 | 1.29 | >100,000 | 95 |
| 11 | 112 | 26.0 | 25 | 1.62 | 0.15 | 0.018 | 0.11 | 67,000 | >100 |
| 12 | 124 | 26.0 | 25 | 1.67 | 0.12 | 0.019 | 2.77 | 61,000 | 93 |
| 13 | 134 | 26.0 | 25 | 1.66 | 0.11 | 0.020 | 1.81 | 32,000 | 96 |
| 14 | 144 | 26.0 | 25 | 1.76 | 0.12 | 0.024 | 0.11 | 27,000 | >100 |
| 15 | 154 | 26.0 | 25 | 1.90 | 0.12 | 0.025 | 0.54 | 32,000 | >100 |
| 16 | 154 | 26.0 | 25 | 1.79 | 0.12 | 0.031 | 0.02 | 19,000 | >100 |
| 17 | 154 | 52.0 | 25 | 1.85 | 0.12 | 0.057 | 0.99 | 24,000 | >100 |
| 18 | 154 | 52.0 | 25 | 1.82 | 0.12 | 0.050 | 0.02 | 27,000 | >100 |
| 1 | 154 | — | — | 1.78 | 0.12 | — | 0.28 | 20,000 | 72 |

Preparation of Methylhydroxyethylsulfoethylcellulose (MHESEC)

176 g of water-moist (46% $H_2O$) methylhydroxyethylcellulose (27.2% $OCH_3$; 2.5% $OC_2H_4$; relative to dry matter) are treated in a kneader with 8 g of concentrated sodium hydroxide solution (49.5%). Sodium vinylsulfonate solution (30%) is added and allowed to react for 20 hours at 90° C. After neutralization with acetic acid, the product is washed with hot water.

TABLE 2

Methylhydroxyethylsulfoethylcellulose (MHESEC)

| Example Comparison Example | Quantity employed NaVS (g) | Degree of substitution M | HE | SE | Salt content (%) | Viscosity (mPa · s) (1%) | Flocculation temp. (°C.) |
|---|---|---|---|---|---|---|---|
| 19 | 21.5 | 1.64 | 0.09 | 0.007 | 0.0 | 4,200 | 79 |
| 20 | 43.0 | 1.62 | 0.09 | 0.009 | 0.0 | 3,499 | 82 |
| 2 | — | 1.67 | 0.11 | — | 0.0 | 2,200 | 76 |

Preparation of Methylhydroxypropylsulfoethylcellulose (MHPSEC)

3,000 g of spruce cellulose pulp are suspended in a reaction mixture in 17 l of 95% dimethylglycol or dioxane. After blanketing with nitrogen, the mixture is alkalized with 1,450 g of concentrated sodium hydroxyl solution (49.5%), aqueous sodium vinylsulfonate solution (30%) is mixed in, 313 g of propylene oxide are metered in, and the etherification is carried out for 60 minutes at 90° to 100° C. After

TABLE 3

Methylhydroxypropylsulfoethylcellulose (MHPSEC)

| Example Comparison Example | Quantity employed NaVS (g) | Degree of substitution M | HP | SE | Salt content (%) | Viscosity (mPa · s) (1%) | Flocculation temp. (°C.) |
|---|---|---|---|---|---|---|---|
| 21 | 193 | 1.60 | 0.06 | 0.018 | 0.46 | 4,100 | >100 |
| 22 | 387 | 1.47 | 0.11 | 0.028 | 0.57 | 3,400 | >100 |
| 23 | 387 | 1.47 | 0.11 | 0.028 | 5.08 | 2,800 | >100 |
| 3 | — | 1.66 | 0.13 | — | 0.26 | 2,200 | 70 |

Preparation of Methylsulfoethylcellulose (MSEC)

162 g of ground cellulose pulp are alkalized in a Lödige mixer with a solution of caustic soda in 200 ml of water. Aqueous sodium vinylsulfonate solution is added and mixing is continued for about 15 minutes. After the mixture has been transferred into a pressure-resistant stirred vessel, the latter is evacuated and blanketed with nitrogen, and 1,260 g of methyl chloride are injected. The etherification is carried out for about 60 minutes at 80°–90° C. The product obtained is washed with hot water, dried and finely ground for the application test. Products which do not flocculate in hot water are washed with 80% isopropanol until largely salt-free.

TABLE 4

| | Methylsulfoethylcellulose (MSEC) | | | | | | | |
|---|---|---|---|---|---|---|---|---|
| Example Comparative Example | Quantity employed | | | Degree of substitution | | Salt content | Viscosity (mPa · s) | Flocculation temperature |
| | NaOH (g) | NaVS (g) | (%) | M | SE | (%) | (2%) | (°C.) |
| 24 | 154 | 4.3 | 30 | 1.71 | 0.006 | 0.20 | 32,000 | 63 |
| 25 | 154 | 10.8 | 30 | 1.77 | 0.012 | 0.22 | 45,000 | 78 |
| 26 | 154 | 21.7 | 30 | 1.76 | 0.020 | 0.23 | 34,000 | 95 |
| 27 | 154 | 32.5 | 30 | 1.78 | 0.034 | 1.40 | 17,000 | 99 |
| 28 | 154 | 43.8 | 30 | 1.81 | 0.060 | 0.32 | 13,000 | >100 |
| 29 | 154 | 65.7 | 30 | 1.77 | 0.076 | 4.41 | 9,500 | >100 |
| 30 | 154 | 65.7 | 30 | 1.80 | 0.077 | 1.74 | 9,200 | >100 |
| 4 | 154 | | | 1.87 | | 0.91 | 72,000 | 56 |

Preparation of Methylhydroxyethylsulfoethylcellulose (MHESEC)

167 g of ground cellulose pulp (3% moisture) are alkalized in a Lödige mixer with a solution prepared by mixing under cooling sodium hydroxide (NaOH I) water and an aqueous sodium vinylsulfonate solution (30%). A second portion of sodium hydroxide (NaOH II) is added and mixing is continued for about 15 minutes. After the mixture has been transferred into a pressure-resistant stirred vessel, the latter is evacuated and blanketed with nitrogen, and a mixture of 1260 g of methyl chloride and ethylene oxide is injected. The etherification is carried out for about 60 minutes at 80°–90° C. The product obtained is extracted with 80% isopropanol until largely salt-free, dried and finely ground for the application test.

TABLE 4a

| | Methylhydroxyethylsulfoethylcellulose (MHESEC) | | | | | | | | | |
|---|---|---|---|---|---|---|---|---|---|---|
| | Quantity employed (g) | | | | | | Degree of substitution | | | Floccul. temp. |
| Example | NaOH I | H₂O | NaSV | (%) | NaOH II | EO | M | HE | SE | (°C.) |
| 31 | 66 | 80 | 173.0 | 30 | 154 | 8.0 | 2.08 | 0.07 | 0.315 | >100 |
| 32 | 66 | 80 | 173.0 | 30 | 194 | 4.4 | 2.22 | 0.02 | 0.215 | >100 |
| 33 | 66 | 110 | 129.8 | 30 | 194 | 4.4 | 2.23 | 0.01 | 0.176 | >100 |

Application Examples

The water retention capacity (WRV) of the building material mixtures listed below, containing the sulfoalkylated cellulose ethers according to the invention and known alkyl sulfoalkyl cellulose ethers and also building material mixtures used for comparative purposes, is determined as desired analogously to DIN 18555, Part 7 (Testing of mortars with mineral binders), or analogously to ASTM C 91:

DIN 18555, Part 7:

Defined quantities of carboxymethylated methyl hydroxyethyl cellulose ethers or methyl hydroxypropyl cellulose ethers are added to 500 g of building material mixture. The mixtures obtained are stirred within 15 seconds into the required quantity at 20° C. and then stirred further for about 30 seconds in a mortar mixture at medium speed. Water is added until the fresh mortar prepared has a consistency which corresponds to a slump (of 170±5 mm (DIN 18555, Parts 2 and 8). To determine the water retention capacity, a plastic ring having an internal diameter of 140 mm and a height of 12 mm is used, which rests on a cellulose-pulp card (cut to 190×190 mm, made by Schleicher and Schüll, No. 2727). A fiber nonwoven (diameter 185 mm, made by Schleicher and Schüll, No. 0980) is located between the plastic ring and the cellulose pulp card. For the actual measurement step, about 150 g of the building material mixture are, immediately after the stirring described above, filled into the plastic ring within 5 seconds. The supernatant fresh mortar is stripped off using a trowel; the quantity present in the ring is determined accurately by weighing. Within a suction time of 5 minutes, the cellulose pulp card draws water out of the mass; the precise quantity is determined by re-weighing the moist card. The fiber nonwoven only serves the purpose of enabling the mortar mass to be more easily taken off from the card after a suction time of 5 minutes. The mortar retention capacity is defined as the percentage fraction of the remaining quantity of water relative to the total quantity at the start of the test.

ASTM C 91:

In this case, water is removed from the prepared building material mixtures via a vacuum. The dry mortar is stirred up in a predetermined quantity of water in a laboratory mixer. A suction filter is filled with the mixed fresh mortar and exposed to a vacuum (cement plaster: differential pressure 6700 Pa, 15 minutes; the adhesive: vacuum 8000 Pa, 3 minutes). The water retention capacity is defined as the percentage content of the remaining quantity of water relative to the total quantity of water at the start of the test.

Table 5 shows the characteristic data of the building material mixtures used.

The air-entraining agent used is •Hostapur OSB (sodium olefinsulfonate).

The starch ether has the following characteristic data: hydroxypropylstarch, $MS_{hydroxypropyl}$: 0.5, particle fineness: <200 µm, viscosity: 20 mPa.s (2% solution, Höppler viscometer, 20° C.).

The waterproofing agent used is zinc stearate.

The plastic dispersion powder used is •Mowilith DM 200 p. The setting retarder used in the gypsum adhesive is •Zeliquid GA 1, and that used in the gypsum/lime plaster and gypsum plaster is Zeliquid GA 7.

The test for the water retention capacity is carried out at 20° C. and at 40° C. At the higher temperature, the working apparatus, the dry mixture and also the mixing water are heated to 40° C.

TABLE 5

Composition of the building material mixtures used (parts by weight)

| Components | Gypsum plaster | Gypsum/lime sand plaster | Gypsum adhesive | Tile adhesive/ building adhesive | Lime/cement plaster | Reinforcing cement plaster |
|---|---|---|---|---|---|---|
| Stucco gypsum | 40 | 40 | 100 | — | — | — |
| Flooring gypsum | 49 | — | — | — | — | — |
| Hydrated lime | 2 | 6 | — | — | 5 | 3 |
| Portland cement | — | — | — | 40 | 13 | 15 |
| Limestone sand | 8 | 53 | — | — | 40 | 9 |
| Quartz sand | — | — | — | 60 | 40 | 73 |
| Perlite | 1 | 1 | — | — | 2 | — |
| Cellulose ether | 0.22 | 0.18 | 0.7 | 0.6 | 0.12 | 0.10–0.12 |
| Air-entraining agent | 0.01 | 0.01 | — | — | 0.015 | 0.01 |
| Starch ether | 0.02 | 0.02 | — | 0.05 | 0.02 | 0.02 |
| Waterproofing agent | — | — | — | — | — | 0.3 |
| Setting retarder | 0.1 | 0.1 | 0.2 | — | — | — |
| Plastic dispersion powder | — | — | — | 1.5 | — | — |
| Water | 60 | 50 | 70 | 30 | 22 | 20 |

TABLE 6

Characteristic data of the cellulose ethers used for purposes of comparing the building material mixtures

| Comparison Example | Type of ether | MS HE/HP | DS | Viscosity (mPa · s, 2%) |
|---|---|---|---|---|
| 5 | MHEC | 0.13 | 1.5 | 60,000 |
| 6 | MHPC | 0.16 | 1.5 | 40,000 |
| 7 | MHEC | 0.10 | 1.8 | 30,000 |
| 8 | MHEC | 0.22 | 1.5 | 60,000 |
| 9 | MC | — | 1.9 | 72,000 |

TABLE 7

Water retention capacity (MRV) in gypsum plaster (tested according to DIN 18 555, Part 7)

| Example Comparison Example | Type of ether | WRV (%) 20° C. | 40° C. | ΔWRV |
|---|---|---|---|---|
| 14 | MHESEC | 94.8 | 92.6 | 2.2 |
| 5 | MHESEC | 99.0 | 97.7 | 1.3 |
| 21 | MHPSEC | 99.1 | 97.0 | 2.1 |
| 29 | MSEC | 98.9 | 98.0 | 0.9 |
| 9 | MC | 98.4 | 85.9 | 14.5 |
| 5 | MHEC | 99.5 | 95.0 | 4.5 |
| 6 | MHPC | 98.4 | 93.2 | 5.2 |

TABLE 8

Water retention capacity (WRV) in gypsum/lime plaster (tested according to DIN 18 555, Part 7)

| Example Comparison Example | Type of ether | WRV (%) 20° C. | 40° C. | ΔWRV |
|---|---|---|---|---|
| 54 | MHESEC | 95.2 | 93.8 | 1.4 |
| 21 | MHPSEC | 94.4 | 92.0 | 2.4 |

TABLE 8-continued

Water retention capacity (WRV) in gypsum/lime plaster (tested according to DIN 18 555, Part 7)

| Example Comparison Example | Type of ether | WRV (%) 20° C. | 40° C. | ΔWRV |
|---|---|---|---|---|
| 29 | MSEC | 94.8 | 91.9 | 2.9 |
| 5 | MHEC | 95.9 | 90.2 | 5.7 |

TABLE 9

Water retention capacity (WRV) in gypsum adhesive (tested according to DIN 18 555, Part 7, suction time: 30 minutes)

| Example Comparison Example | Type of ether | WRV (%) 20° C. | 40° C. | ΔWRV |
|---|---|---|---|---|
| 5 | MHESEC | 99.3 | 98.8 | 0.5 |
| 21 | MHPSEC | 99.5 | 98.9 | 0.6 |
| 5 | MHEC | 99.2 | 86.1 | 13.1 |

TABLE 10

Water retention capacity (WRV) in tile adhesive
(tested according to ASTM C 91)

| Example Comparison Example | Type of ether | WRV (%) 20° C. | 40° C. | ΔWRV |
|---|---|---|---|---|
| 5 | MHESEC | 99.7 | 99.1 | 0.6 |
| 21 | MHPSEC | 99.5 | 99.2 | 0.3 |
| 29 | MSEC | 98.9 | 98.9 | 0.5 |
| 5 | MHEC | 99.7 | 76.9 | 22.8 |

TABLE 11

Water retention capacity (WRV) in lime/cement
plaster (tested according to ASTM C 91)

| Example Comparison Example | Type of ether | WRV (%) 20° C. | 40° C. | ΔWRV |
|---|---|---|---|---|
| 5 | MHESEC | 95.4 | 93.6 | 1.8 |
| 21 | MHPSEC | 96.7 | 94.8 | 1.9 |
| 29 | MSEC | 95.8 | 93.9 | 1.9 |
| 5 | MHEC | 96.1 | 90.2 | 5.9 |
| 6 | MHPC | 94.2 | 89.7 | 4.5 |

TABLE 12

Water retention capacity (WRV) in reinforcing
cement plaster (tested according to ASTM C 91)

| Example Comparison Example | Type of ether | WRV (%) 20° C. | 40° C. | ΔWRV |
|---|---|---|---|---|
| 4 | MHESEC | 96.4 | 91.9 | 4.5 |
| 12 | MHESEC | 96.8 | 96.0 | 0.8 |
| 5 | MHESEC | 99.7 | 98.9 | 0.8 |
| 7 | MHESEC | 96.1 | 95.9 | 0.2 |
| 11 | MHESEC | 97.1 | 93.5 | 3.6 |
| 13 | MHESEC | 97.9 | 97.8 | 0.1 |
| 15 | MHESEC | 93.6 | 95.9 | 0.4 |
| 17 | MHESEC | 96.1 | 96.0 | 0.1 |
| 21 | MHPSEC | 98.4 | 96.0 | 2.4 |
| 22 | MHPSEC | 98.5 | 96.7 | 1.8 |
| 24 | MSEC | 94.4 | 88.6 | 6.0 |
| 28 | MSEC | 93.1 | 92.3 | 0.8 |
| 29 | MSEC | 93.8 | 92.1 | 1.7 |
| 5 | MHEC | 98.9 | 89.4 | 9.5 |
| 6 | MHPC | 96.4 | 91.4 | 5.0 |
| 7 | MHEC | 94.7 | 87.5 | 7.2 |
| 8 | MHEC | 98.4 | 93.7 | 4.7 |

We claim:

1. An alkyl monohydroxyalkyl cellulose ether, which contains a sulfoalkyl group as a further ether substituent and has an average degree of substitution ($DS_{sulfoalkyl}$) below 0.4.

2. The cellulose ether as claimed in claim 1, which contains a sulfoalkyi group having 1–4 carbon atoms.

3. The cellulose ether as claimed in claim 1, which has a $DS_{alkyl}$ from 1.0 to 2.0 and an $MS_{hydroxyalkyl}$ from 0.01 to 1.

4. The cullulose ether as claimed in claim 1, which has a molecular weight between 10,000 and 500,000.

5. The cellulose ether as claimed in claim 1, which has a viscosity between 3 and 300,000 mPa.s, 2% by weight aqueous solution, 20° C.

6. The cellulose ether as claimed in claim 1, wherein the average degree of substitution is between about 0.004 and below 0.4.

7. The cellulose ether as claimed in claim 1, which contains a sulfoethyl group or a sulfopropyl group.

8. The cellulose ether as claimed in claim 6, which contains a sulfoethyl group or a sulfopropyl group.

9. A ($C_1$–$C_3$) alkyl monohydroxyethyl or monohydroxypropyl cellulose ether, containing a sulfoethyl group or sulfopropyl group as a further ether substituent and having an average degree of substitution ($DS_{sulfoethyl/sulfopropyl}$) below 0.4 and a molar degree of substitution ($MS_{hydroxyethyl/hydroxypropyl}$) from 0.01 to 1.

10. A process for preparing a cellulose ether as claimed in claim 1 by etherification of cellulose in an alkaline medium with at least one compound transferring an alkyl group, with at least one compound transferring a hydroxyalkyl group and with at least one compound transferring a sulfoalkyl group, comprising the process steps of:

a) alkalizing the cellulose, b) adding the compound transferring hydroxyalkyl groups during or subsequently to a), c) optionally adding further alkalizing agent subsequently to b), d) adding the compound transferring alkyl groups during or subsequently to b) and e) adding the compound transferring sulfoalkyl groups before d).

11. The process as claimed in claim 10, wherein the compound transferring sulfoalkyl groups and the compound transferring hydroxyalkyl groups are added during the alkalization of the cellulose (step a) and subsequently, further alkalizing agent is added (step c), and the compound transferring alkyl groups is added during or subsequently to (c).

12. The process as claimed in claim 10, wherein the cellulose ether prepared is purified after the alkylation.

13. A process for preparing a cellulose ether as claimed in claim 1, by etherification of an alkyl hydroxyalkyl cellulose ether in an alkaline medium with at least one compound transferring a sulfoalkyl group, wherein the etherification is carded out at a pH above 7 and at a temperature of up to 90° C.

14. A building material mixture comprising gypsum, hydrated lime or cement and a cellulose ether as claimed in claim 1.

15. The building material mixture as claimed in claim 14, further comprising a cellulose ether selected from the group consisting of sulfoalkyl cellulose ether, alkyl sulfoalkyl cellulose ether, hydroxypropyl sulfoethyl cellulose ether, hydroxypropyl sulfopropyl cellulose ether and hydroxyethyl sulfoethyl cellulose ether.

16. A method of using a cellulose ether as claimed in claim 1 in a building material mixture for improving the water retention of the building material mixture.

* * * * *